United States Patent
Banavalikar et al.

(10) Patent No.: US 9,237,111 B2
(45) Date of Patent: Jan. 12, 2016

(54) CREDIT-BASED FLOW CONTROL IN LOSSLESS ETHERNET NETWORKS

(71) Applicant: International Business Machines Corporation, Armonk, NY (US)

(72) Inventors: Bhalachandra G. Banavalikar, Cupertino, CA (US); Casimer M. DeCusatis, Poughkeepsie, NY (US); Mircea Gusat, Langnau (CH); Keshav G. Kamble, Fremont, CA (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 13/830,858

(22) Filed: Mar. 14, 2013

(65) Prior Publication Data

US 2014/0269274 A1    Sep. 18, 2014

(51) Int. Cl.
*H04L 12/801* (2013.01)
*H04L 12/933* (2013.01)

(52) U.S. Cl.
CPC ............... *H04L 47/39* (2013.01); *H04L 49/10* (2013.01)

(58) Field of Classification Search
CPC ..... H04L 47/263; H04L 47/00; H04L 12/215; H04L 47/21; H04L 29/06537
USPC ........................................................ 709/235
See application file for complete search history.

(56) References Cited

U.S. PATENT DOCUMENTS

| | | | |
|---|---|---|---|
| 7,408,875 B2 | 8/2008 | Garmire et al. | |
| 7,792,098 B2 | 9/2010 | Garmire et al. | |
| 2004/0071086 A1* | 4/2004 | Haumont | H04L 12/5602 370/230 |
| 2005/0157723 A1* | 7/2005 | Kim | H04L 47/215 370/392 |
| 2005/0226145 A1 | 10/2005 | Garmire et al. | |
| 2006/0153078 A1 | 7/2006 | Yasui | |
| 2008/0205278 A1 | 8/2008 | Garmire et al. | |
| 2009/0006910 A1* | 1/2009 | Hamzeh | 714/704 |
| 2011/0051735 A1 | 3/2011 | Matthews et al. | |
| 2012/0147744 A1* | 6/2012 | Lee | H04L 47/20 370/230 |
| 2014/0204742 A1* | 7/2014 | Pandit | H04L 47/263 370/231 |
| 2014/0223026 A1* | 8/2014 | Tamir | H04L 67/1097 709/235 |

FOREIGN PATENT DOCUMENTS

| | | |
|---|---|---|
| CN | 1681262 A | 10/2005 |
| CN | 1797380 A | 7/2006 |
| WO | 2006047194 A2 | 5/2006 |

OTHER PUBLICATIONS

International Search Report and Written Opinion from PCT Application No. PCT/CN2014/072934, dated May 28, 2014.

\* cited by examiner

*Primary Examiner* — Brandon Renner
*Assistant Examiner* — Voster Preval
(74) *Attorney, Agent, or Firm* — Zilka-Kotab, PC

(57) ABSTRACT

In one embodiment, a system includes a hardware processor and logic integrated with and/or executable by the processor or media access control (MAC) functionality of a network port, the logic being adapted to initialize a link between a receiving endpoint and a sending endpoint, the receiving and sending endpoints being connected in a network fabric, wherein at least one virtual link is created within the link, receive an amount of available flow credits from the receiving endpoint, wherein the amount of available flow credits are used to determine a capacity to process packets at the receiving endpoint, and transmit one or more packets to the receiving endpoint until all packets are sent or the amount of available flow credits is insufficient to process additional packets, wherein exchange of flow credits is performed on a per virtual link basis.

20 Claims, 10 Drawing Sheets

CREDIT-BASED FLOW CONTROL IN LOSSLESS ETHERNET NETWORKS

BACKGROUND

The present invention relates to data center management and file systems, and more specifically, this invention relates to using credit-based flow control in lossless Ethernet networks.

Currently available lossless Ethernet networks do not allow for credit-based flow control where how traffic flows are prioritized and handled is determined based on an available amount of credit. Instead, conventional lossless Ethernet networks, and more specifically the switches used therein, when an issue or problem arises and a packet is undeliverable, simply discard the packet, and in some instances, retransmit the discarded packets at a later time. This approach adds additional latency to the network when a packet is undeliverable, and may result in some packets being dropped permanently, even in the lossless Ethernet network.

Ethernet is becoming more and more popular and some conventional switched fabric networks may make use of credit-based flow control, such as InfiniBand and other network protocols; however, these credit-based flow control systems are not applicable nor are they capable of being used in Ethernet networks or to utilize existing Ethernet frame formats and protocols.

BRIEF SUMMARY

In one embodiment, a system includes a hardware processor and logic integrated with and/or executable by the processor or media access control (MAC) functionality of a network port, the logic being adapted to initialize a link between a receiving endpoint and a sending endpoint, the receiving and sending endpoints being connected in a network fabric, wherein at least one virtual link is created within the link, receive an amount of available flow credits from the receiving endpoint, wherein the amount of available flow credits are used to determine a capacity to process packets at the receiving endpoint, and transmit one or more packets to the receiving endpoint until all packets are sent or the amount of available flow credits is insufficient to process additional packets, wherein exchange of flow credits is performed on a per virtual link basis.

In another embodiment, a computer program product for providing credit-based flow control includes a computer readable storage medium having program code embodied therewith, the program code readable/executable by a processor to initialize, using the processor, a link between a receiving endpoint and a sending endpoint, the receiving and sending endpoints being connected in a network fabric, the link includes at least one virtual link, send, using the processor, an amount of available flow credits to the sending endpoint, wherein the amount of available flow credits are used to determine a capacity to process packets, receive, using the processor, one or more packets from the sending endpoint, decrease, using the processor, the amount of available flow credits by an amount corresponding to data in the one or more packets that is successfully received, and receive, using the processor, replacement flow credits equal to the data in the one or more packets successfully forwarded by the receiving endpoint, wherein exchange of flow credits is performed on a per virtual link basis.

In yet another embodiment, a method for providing credit-based flow control includes initializing a link between a receiving endpoint and a sending endpoint, the receiving and sending endpoints being connected in a network fabric, wherein the link includes at least one virtual link and in an iterative process until the sending endpoint has no further packets to transmit: sending an amount of available flow credits from the receiving endpoint to the sending endpoint, wherein the amount of available flow credits are used to determine a capacity to process packets at the receiving endpoint, transmitting one or more packets from the sending endpoint to the receiving endpoint, decreasing the amount of available flow credits by an amount corresponding to data in the one or more packets that is successfully received by the receiving endpoint, and sending an amount of flow credits from the sending endpoint to the receiving endpoint in an amount equivalent to the data in the one or more packets successfully forwarded by the receiving endpoint, wherein exchange of flow credits is performed on a per virtual link basis.

According to another embodiment, a system includes a hardware processor and logic integrated with and/or executable by the processor, the logic being adapted to generate a plurality of flow credits and distribute one or more flow credits to every interface and/or port, wherein the flow credits are exchanged with other devices in order to provide for processing of packets sent thereto, and wherein an amount of flow credits distributed to an interface or port is proportionate to a bandwidth of the interface or port or according to a predetermined policy.

Other aspects and embodiments of the present invention will become apparent from the following detailed description, which, when taken in conjunction with the drawings, illustrate by way of example the principles of the invention.

DETAILED DESCRIPTION

Figure 1:
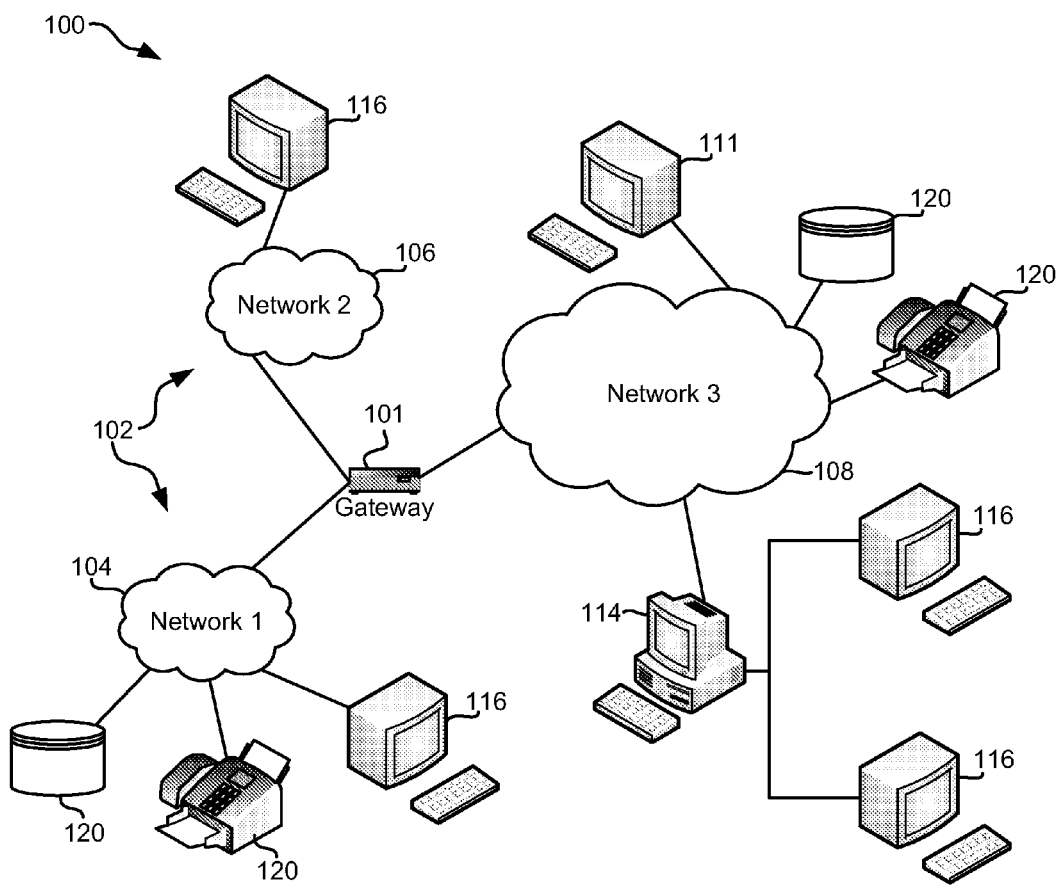
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for implementing unicast, broadcast, and multicast credit-based flow control in lossless Ethernet networks. Particularly, a credit-based flow control mechanism allows for the convergence of Ethernet protocols with existing or new InfiniBand, remote direct memory access (RDMA), or any other protocol that provides for credit-based flow control into a single, common link type, e.g., RDMA over converged Ethernet (RoCE) and/or internet wide area RDMA protocol (iWARP) approaches with lossless Ethernet. The credit-based flow control may be implemented in a software defined network (SDN) environment in various approaches.

In one general embodiment, a system includes a hardware processor and logic integrated with and/or executable by the processor or media access control (MAC) functionality of a network port, the logic being adapted to initialize a link between a receiving endpoint and a sending endpoint, the receiving and sending endpoints being connected in a network fabric, wherein at least one virtual link is created within the link, receive an amount of available flow credits from the receiving endpoint, wherein the amount of available flow credits is used to determine a capacity to process packets at the receiving endpoint, and transmit one or more packets to the receiving endpoint until all packets are sent or the amount of available flow credits is insufficient to process additional packets, wherein exchange of flow credits is performed on a per virtual link basis.

In another general embodiment, a computer program product for providing credit-based flow control includes a computer readable storage medium having program code embodied therewith, the program code readable/executable by a processor to initialize, using the processor, a link between a receiving endpoint and a sending endpoint, the receiving and sending endpoints being connected in a network fabric, the link includes at least one virtual link, send, using the processor, an amount of available flow credits to the sending endpoint, wherein the amount of available flow credits is used to determine a capacity to process packets, receive, using the processor, one or more packets from the sending endpoint, decrease, using the processor, the amount of available flow credits by an amount corresponding to data in the one or more packets that is successfully received, and receive, using the processor, replacement flow credits equal to the data in the one or more packets successfully forwarded by the receiving endpoint, wherein exchange of flow credits is performed on a per virtual link basis.

In yet another general embodiment, a method for providing credit-based flow control includes initializing a link between a receiving endpoint and a sending endpoint, the receiving and sending endpoints being connected in a network fabric, wherein the link includes at least one virtual link and in an iterative process until the sending endpoint has no further packets to transmit: sending an amount of available flow credits from the receiving endpoint to the sending endpoint, wherein the amount of available flow credits is used to determine a capacity to process packets at the receiving endpoint, transmitting one or more packets from the sending endpoint to the receiving endpoint, decreasing the amount of available flow credits by an amount corresponding to data in the one or more packets that is successfully received by the receiving endpoint, and sending an amount of flow credits from the sending endpoint to the receiving endpoint in an amount equivalent to the data in the one or more packets successfully forwarded by the receiving endpoint, wherein exchange of flow credits is performed on a per virtual link basis.

According to another general embodiment, a system includes a hardware processor and logic integrated with and/or executable by the processor, the logic being adapted to generate a plurality of flow credits and distribute one or more flow credits to every interface and/or port, wherein the flow credits are exchanged with other devices in order to provide for processing of packets sent thereto, and wherein an amount of flow credits distributed to an interface or port is proportionate to a bandwidth of the interface or port or according to a predetermined policy.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, processor, or device.

A computer readable signal medium may include a propagated data signal with computer readable program code embodied therein, for example, in baseband, as part of a carrier wave, an electrical connection having one or more wires, an optical fiber, etc. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
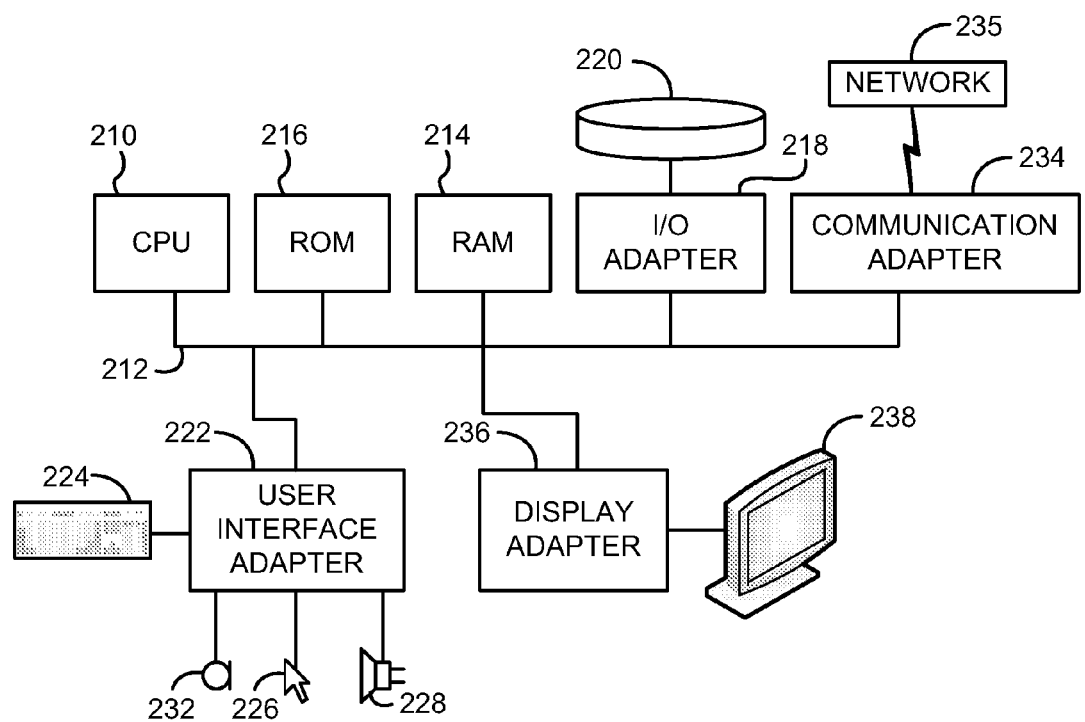
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
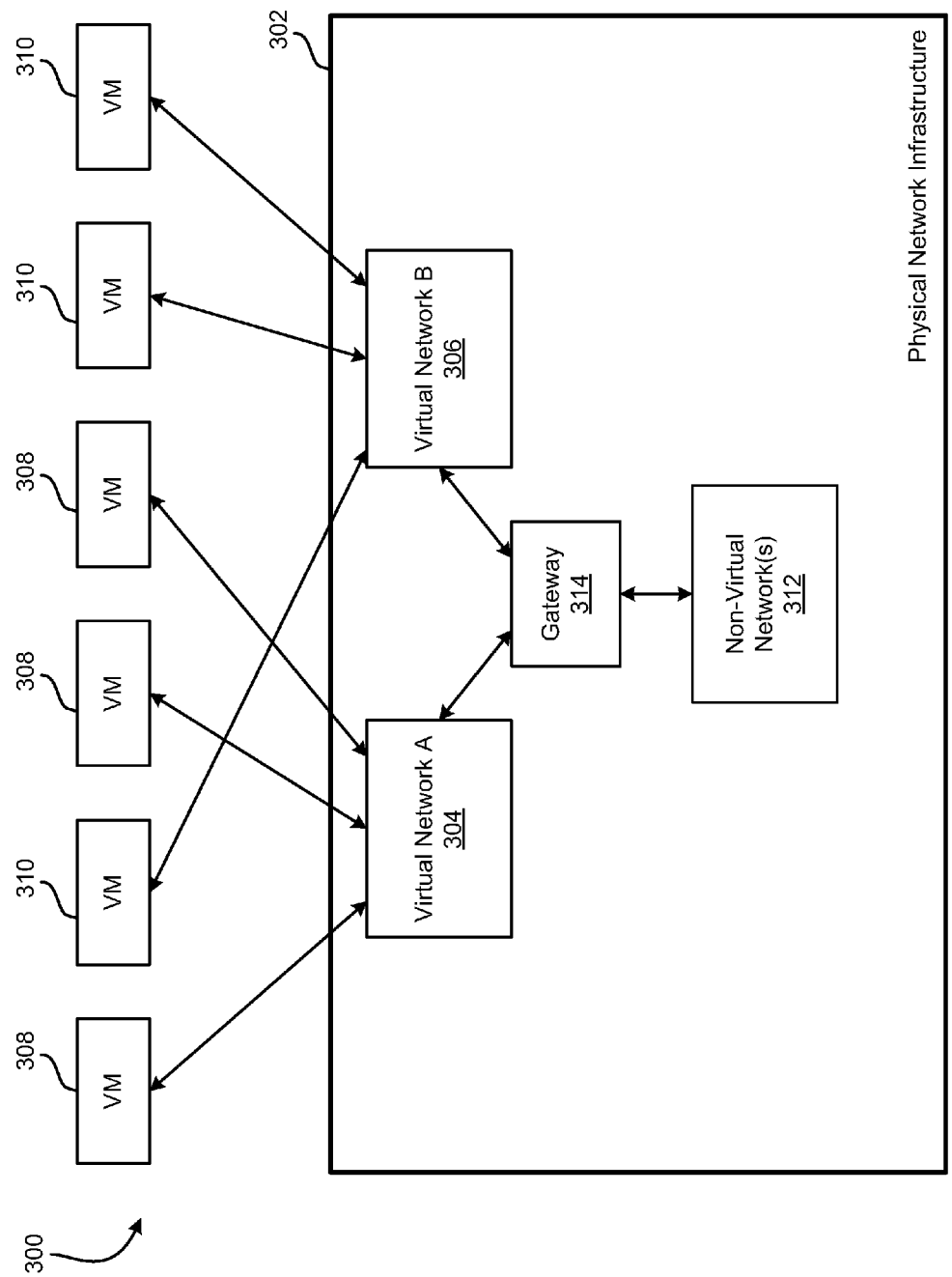
FIG. 3 shows a conceptual view of an overlay network, according to one embodiment.

Referring now to FIG. 3, a conceptual view of an overlay network 300 is shown according to one embodiment. The overlay network may utilize any overlay technology, standard, or protocol, such as a Virtual eXtensible Local Area Network (VXLAN), Distributed Overlay Virtual Ethernet (DOVE), Network Virtualization using Generic Routing Encapsulation (NVGRE), etc.

In order to virtualize network services, other than simply providing a fabric communication path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across Layer-3 (L3) domains, between one subnet to another subnet, internet protocol (IP) subnet to IP subnet, etc. But if it the architecture is similar to a large flat switch, in a very large Layer-2 (L2) domain, then the VMs are aided in their attempt to move data across the architecture.

Figure 4:
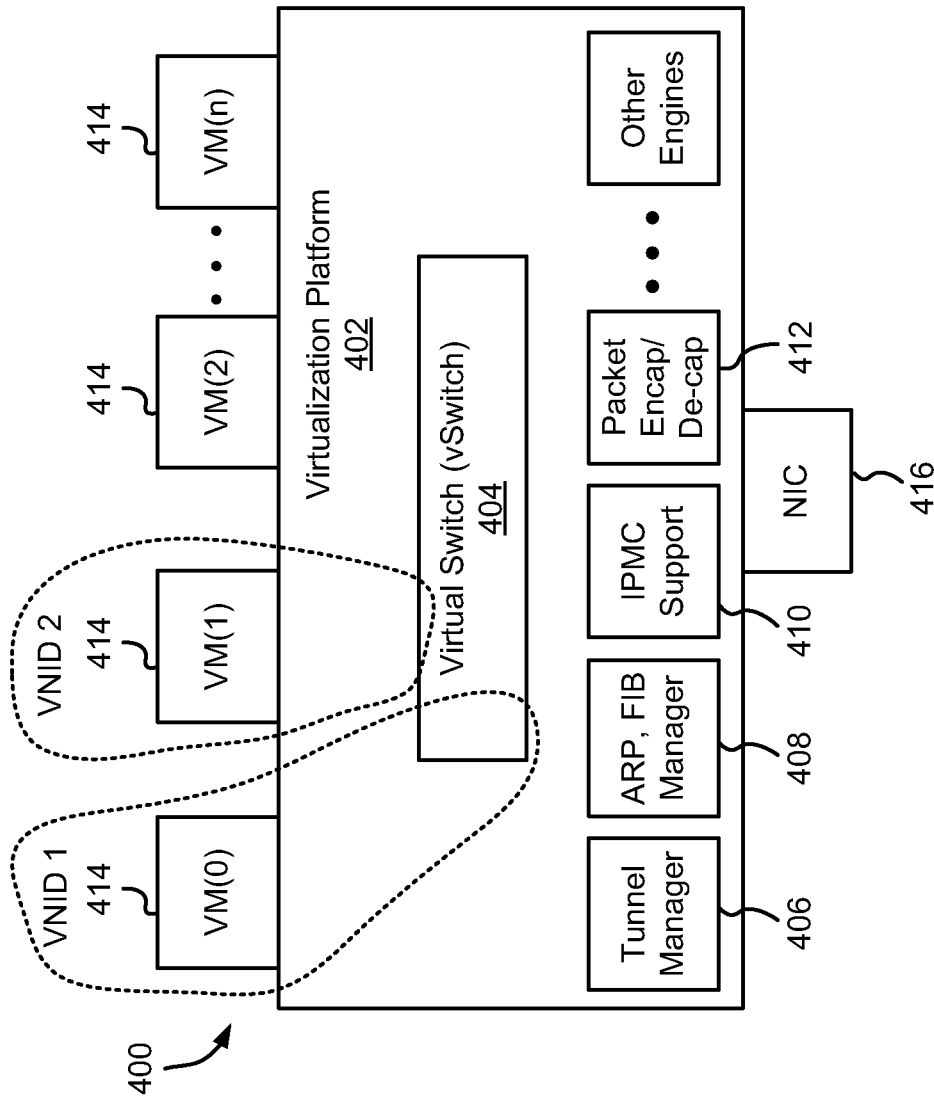
FIG. 4 shows a server, according to one embodiment.

With reference to FIG. 4, a server 400 is shown according to one embodiment. As shown, the server 400 includes a virtualization platform 402 which provides and manages a vSwitch 404.

According to one embodiment, overlay functionality may be provided to the server 400. In order to accomplish this, the virtualization platform 402 may interact with a plurality of discrete software engines, such as a tunnel manager 406, an ARP and forwarding information base (FIB) manager 408, an engine for providing internet protocol multicast (IPMC) support 410, a packet encapsulation and de-capsulation engine 412, and any other overlay-enhancing software engines as known in the art. In another embodiment, these modules or software engines may be enacted on the NIC 416, or an overlay gateway connected via the NIC 416 to the server 400.

According to one embodiment, the NIC 416 may be a hardware NIC or a virtual NIC (vNIC) provided by the server 400, or a combination of a hardware NIC and a vNIC, as would be understood by one of skill in the art. The server 400 may provide the vNIC via a processor, the virtualization platform 402, or any other module or aspect of the server 400.

The virtualization platform 402 also provides support for any number of VMs 414, shown in FIG. 4 as VM(0), VM(1), VM(2), . . . , VM(n). The VMs 414 may be arranged in one or more virtual networks (each virtual network may have a different virtual network identifier (VNID), such as VNID 1, VNID 2, VNID 3, etc.). The number and arrangement of the VMs 414 in the exemplary virtual networks is not meant to be limiting on what configurations are possible, as the Figures only show exemplary arrangements of VMs 414 and virtual networks.

Figure 5:
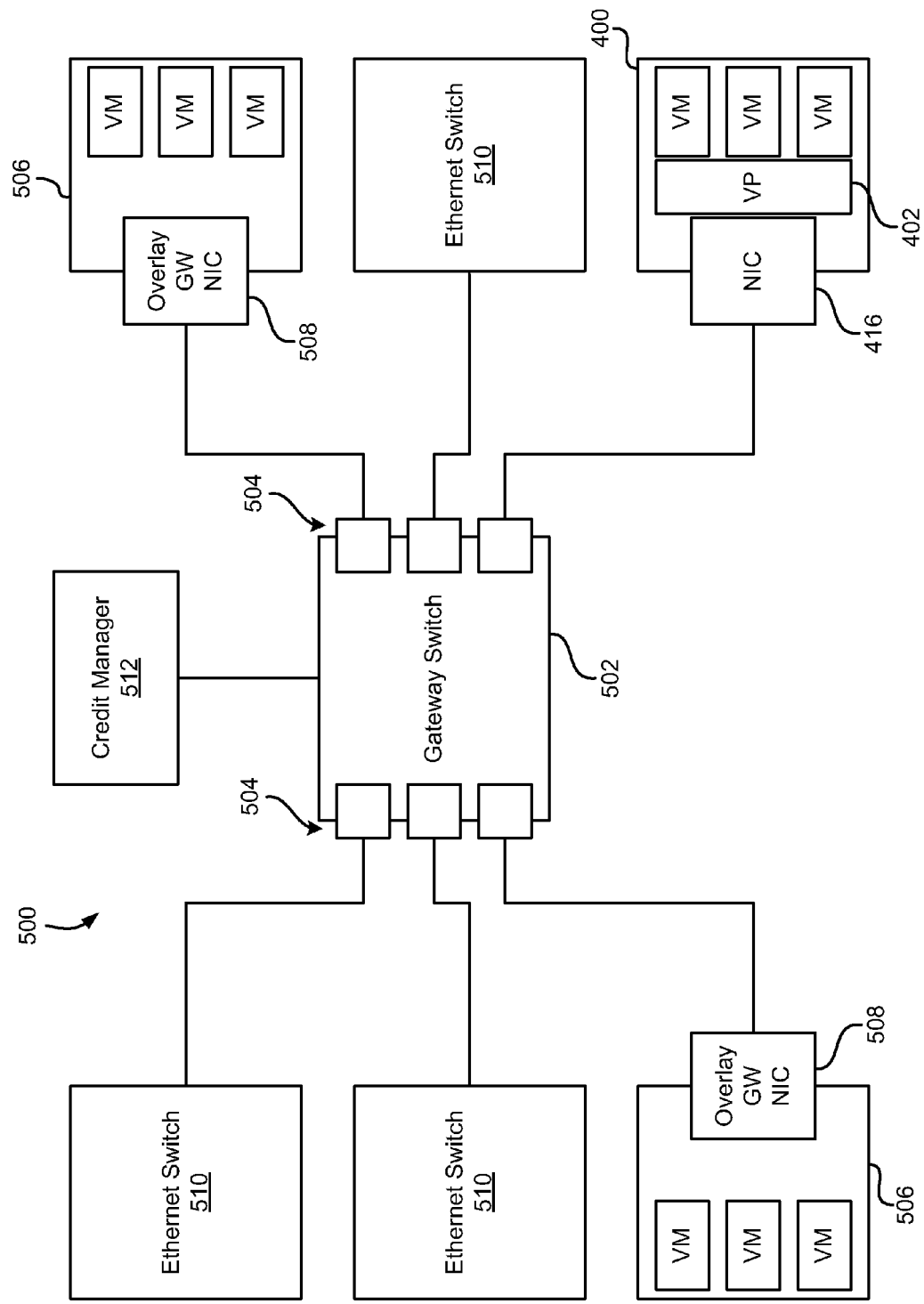
FIG. 5 shows a network, according to one embodiment.

In FIG. 5, a network 500 is shown according to one embodiment. As shown, servers 400 having contemporary NICs 416 and servers 506 having overlay gateway (GW) NICs 508 may be used in the same network 500. One or more Ethernet switches 510 may be included in the network 500, and a gateway switch 502 may be provided which is interconnected and/or accessible to all devices, switches 510, virtual switches, and any other devices in the network 500, according to one embodiment. The gateway switch 502 may be used to interconnect the servers 400, 506 and Ethernet switches 510 or the servers 400, 506 and Ethernet switches 510 may be connected directly to one another. The gateway switch 502 may operate according to OpenFlow and/or other SDN standards, i.e., the gateway switch 502 may be adapted to communicate with a switch controller (described in more detail in FIG. 7).

Referring again to FIG. 5, each Ethernet switch 510 and the gateway switch 502 include a plurality of ports 504 for connecting thereto and transmitting and/or receiving packets, such as data packets, control packets, etc. The contemporary NICs 416 may communicate via a virtualization platform (VP) 402 that may provide some overlay functionality, in other embodiments. Furthermore, the network 500 may include a credit manager 512 adapted to distribute flow credits to all ports in the network 500 according to a priority of each individual port. In another embodiment, the credit manager 512 be implemented by a switch controller which is capable of communicating to any SDN-compliant switches 510, servers 400, 506, and other SDN-compliant devices in the network 500, whether virtual or physical. In addition, the credit manager 512 may be a module or other soft logic which may be implemented by a processor of another device in the network 500, such as a switch controller.

Figure 6:
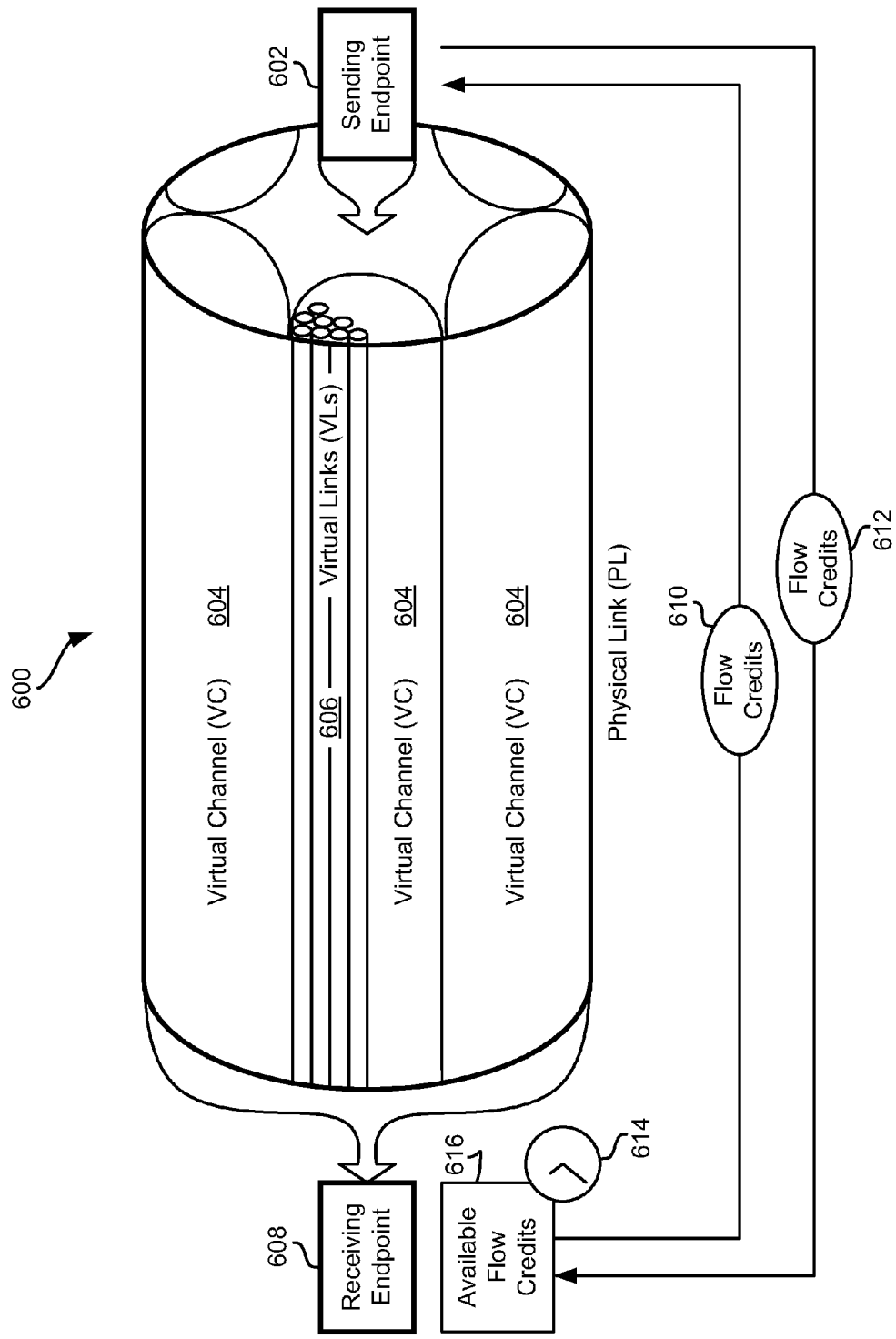
FIG. 6 shows physical link slicing, according to one embodiment.

With reference to FIG. 6, physical link slicing is shown, according to one embodiment. A physical link (PL) 600 between any two endpoints 602, 608 is shown, for exemplary purposes. The physical link 600 is shown in an exaggerated fashion in order to more clearly depict elements of the physical link 600, as explained in more detail herein. This physical link 600 may be representative of any physical link described herein. The physical link 600 is preferably a hardwired connection in order to provide the greatest amount of bandwidth therethrough, but in other embodiments may be wireless. The endpoints 602, 608 may be any physical devices capable of sending and/or receiving packets, such as hosts, switches, servers, routers, etc.

The physical link 600 may be partitioned into one or more subunits referred to as virtual channels (VCs) 604. Each virtual channel 604 represents a logically isolated and managed slice of the physical link 600. Furthermore, a virtual channel 604 may be designated for a specific tenant/customer/user which utilizes (sends and/or receives packets via) the physical link 600, in one approach. Of course, one tenant may utilize more than one virtual channel 604 in the physical link 600, in other embodiments. A physical link 600 may be split up into any number of virtual channels 604 in order to accommodate traffic from as many tenants as is desired and based on available bandwidth. In addition, each virtual channel 604 may grow or shrink dynamically based on a tenant's usage and/or need for bandwidth.

Furthermore, each virtual channel 604 may be partitioned into one or more virtual links or virtual lanes (VLs) 606. Each virtual link 606 represents a logical path within a virtual channel 604, and provides the lowest level of flow control granularity, in one approach. The usage of virtual links 606 avoids any potential of head-of-line blocking that may occur. The number of virtual links 606 which may be created is limited by the lowest denominator from either endpoint 602, 608 of the physical link 600, negotiated at the link initialization, i.e., whichever endpoint 602, 608 allows the fewest number of virtual links 606 dictates this number as the maximum.

In addition, one or more virtual links 606 may be designated to receive traffic of a particular priority, as designated by some flag or priority bits in a packet header or through some other apparent designation technique that is able to be understood by the various endpoints in the network. In some approaches, a particular priority may have no virtual links 606 designated to receive traffic having this priority.

In one exemplary embodiment, eight priority levels may be designated by a three bit priority code point (PCP) field in a packet header of one or more packets. Therefore, in this embodiment, each virtual channel 604 may be split up into eight virtual links 606 in order to accommodate the eight priorities. Of course, any other number of priorities may be used, with a corresponding number of virtual links 606.

In this way, traffic sent across a physical link 600 may be more easily managed, in order to best utilize the bandwidth of the physical link 600, in various embodiments described herein.

In one embodiment, a virtual link arbitration engine, which may be implemented in a switch controller, switch, endpoints 602, 608, etc., may provide fair scheduling of network traffic across the physical link 600 (within virtual links 606, across one or more virtual links 606, across one or more virtual channels 604, etc.).

In order for bandwidth slicing to be achieved, and flow control to be implemented on a physical link 600, the lowest level of granularity should be used in arbitrating flow through the physical link 600. Accordingly, flow control is implemented on a per virtual link 606 basis, in preferred embodiments. Of course, flow control may be implemented on a per virtual channel 604 or per physical link 600 basis, but these options provide for much less precise control.

In one embodiment, a receiving endpoint 608 provides an amount of flow credits 610 to a sending endpoint 602 from a group of available flow credits 616. The receiving endpoint 608 may acquire its total available flow credits 616 from a switch controller or some other credit manager, based on the virtual links/virtual channel provisioning per physical link between the endpoints 602, 608 and available memory resources on each endpoint 602, 608. Each flow credit may represent at least 512 bits, also known as a quanta. In other approaches, each flow credit may represent one or more quanta of data. Flow credits may be assigned in terms of quanta. In other embodiments, flow credits may have any suitable size, such as 64 bits, 128 bits, 256 bits, 1024 bits, 2048 bits, etc., as would be understood by one of skill in the art. The smaller the flow credit size, the more granularity is afforded to the flow control scheme. However, there is a point of diminishing returns where it does not improve performance substantially to make the flow credits represent smaller amounts of data. Accordingly, the size of all of the flow credits may be chosen based on particulars of the network fabric in which they are applied, packet size, traffic flow dynamics, etc.

Flow credits are aged at both sides of the transmission, i.e., at the receiving endpoint 608 and the sending endpoint 602. In one embodiment, a local clock or timer may be used to track an age of flow credits at either or both of the sending endpoint 602 and the receiving endpoint 608. In another embodiment, a synchronized clock or timer (such as a global clock or a clock of another component, such as the switch controller) may be used to track an age of flow credits at both of the sending endpoint 602 and the receiving endpoint 608. Use of the assigned flow credits 616 is guaranteed only within the aging duration (denoted by the timer 614), which may be negotiated during initialization of the link 600, or as determined by the switch controller or other credit manager in the network.

Flow credit 610 exchange (from the receiving endpoint 608 to the sending endpoint 602) and consumption updates indicating flow credits 612 used (from the sending endpoint 602 to the receiving endpoint 608) are scheduled events, in one embodiment. A scheduling timer may be triggered at regular intervals in order for the exchange to take place, and in one approach, the interval may be a function of a speed of the physical link 600. Of course, any other factor may be used to determine the interval, as would be understood by one of skill in the art.

In one approach, the round trip time (RTT) of the physical link 600, which may be calculated during link initialization (such as by a handshake between the endpoints 602, 608), may be used as a factor in determining a rate of flow credit aging or an aging duration. This implementation also helps to reduce flow credit starvation at the sending endpoint 602, which may occur due to a plurality of flow credits 610 being exchanged across the physical link 600 at any given time (referred to as in-flight flow credits). In-flight flow credits may be flow credits 610 which have been exchanged from the receiving endpoint 608 to the sending endpoint 602 which have not arrived yet due to the RTT of the physical link 600 being substantial. In another example, a substantial RTT may result in a consumption update indicating flow credits 612 used from the sending endpoint 602 to the receiving endpoint 608 not being received when more packets need to be sent. Either condition may be alleviated by providing for a longer aging duration (as denoted by the timer 614) of the flow credits to accommodate for these situations.

Figure 7:
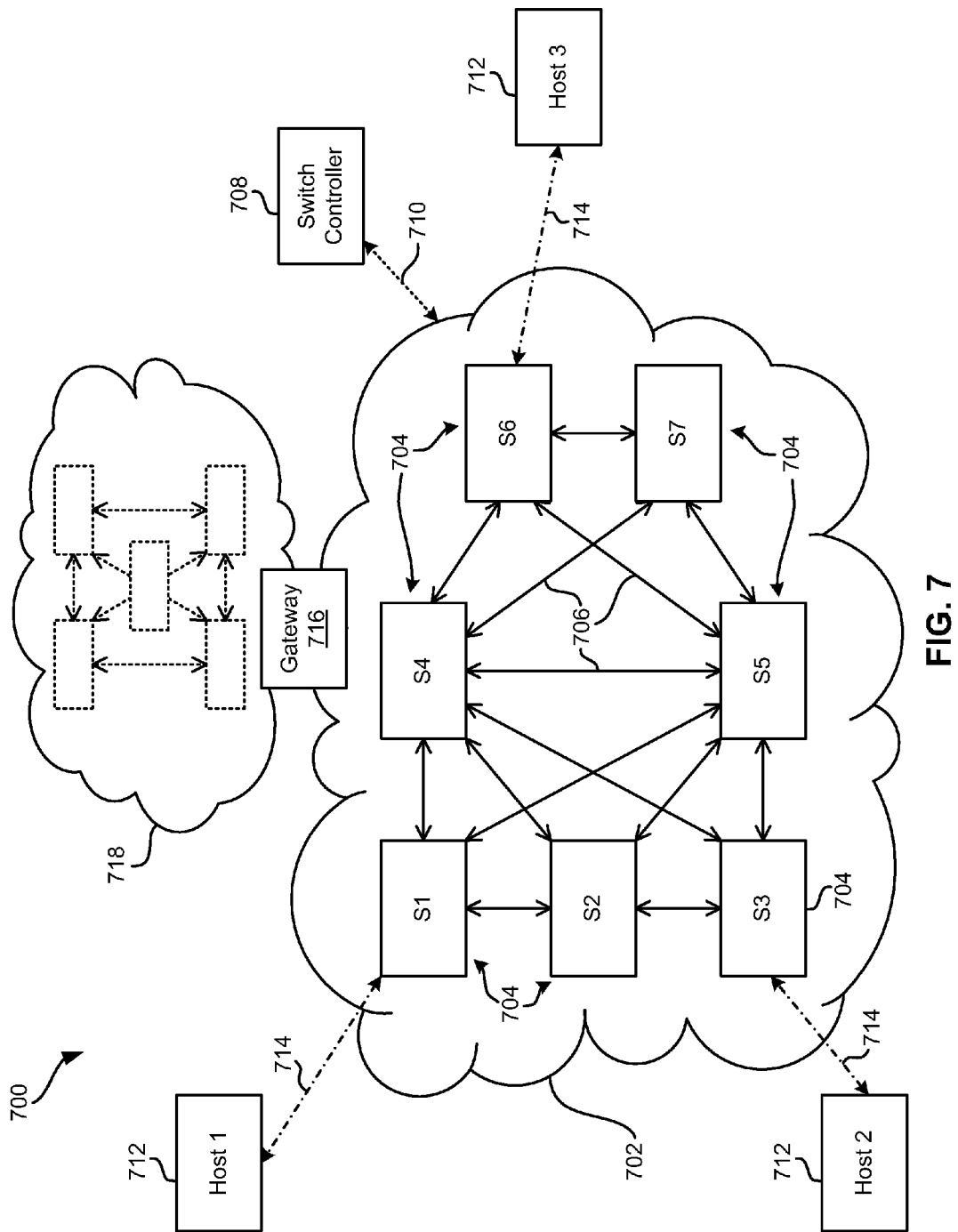
FIG. 7 shows a system using a network fabric, according to another embodiment.

Now referring to FIG. 7, a system 700 using a network fabric is shown according to one embodiment. System 700 has a plurality of fabric switches 704 interconnected in a network fabric 702, each of the fabric switches 704 being connected to one another via connections 706. Each fabric switch 704 is connected, directly or indirectly to a switch controller 708 (as denoted by dashed line connection 710 between the switch controller 708 and the network fabric 702). The switch controller 708 is capable of receiving information from each of the fabric switches 704 and is capable of sending information and/or commands to the fabric switches 704.

According to one embodiment, the switch controller 708 may operate according to OpenFlow and/or SDN standards, and each fabric switch 704 may be OpenFlow and/or SDN compliant. In other embodiments, the switch controller 708 may utilize any application capable of controlling the fabric switches 704 as would be known by one of skill in the art, such as Beacon, Jaxon, NOX, PDX, Maestro, etc.

In addition, the network fabric 702 may be a physical and/or virtual network fabric (a network fabric which utilizes only physical devices, a network fabric which only utilizes virtual devices, and/or a network fabric which utilizes a combination of physical and virtual devices). In addition, each of the fabric switches 704 may be a physical switch, a vSwitch, or a combination thereof.

A gateway 716 may be used to bridge from the network fabric 702 to any other second network 718, whether the second network 718 is capable of communicating with the switch controller 708 or not, in one embodiment. Particularly, the second network 718 may be a conventional Ethernet network that is not a SDN. Therefore, in order for traffic to be sent to the second network 718, it must first be properly formatted to be understood by the various devices in the Ethernet network 718. Therefore, the gateway 716 may be used for this purpose.

The system 700 may further comprise one or more hosts 712 connected to the network fabric 702 via one or more fabric switches 704 via connections 714. Any of the hosts 712 may be a physical host, a virtual host, or a combination thereof. The hosts may be any type of device capable of communicating with the network fabric 702, such as another network, a server, a NIC, a vNIC, a controller, a workstation, an end station, etc. Each host 712 may include an interface for communicating with the network fabric 702 and one or more fabric switches 704 therein.

In accordance with one embodiment, each of the hosts 712 may be unaware of the physical components of the network fabric 702 and instead may view the network fabric 702 as a single entity to which a connection may be made. Of course, each host 712 is actually connected to at least one physical fabric switch 704 within the network fabric 702 when the host is a physical entity. The host 712 may be connected to multiple fabric switches 704 in the case of a Link Aggregation (LAG) connection.

The switch controller 708 may comprise logic adapted to analyze and configure the network fabric 702 such that there is one or more non-looping paths through the network fabric 702 between any two hosts 712 or other end stations connected to the network fabric 702. Ideally, the logic may be able to determine multiple paths through the network fabric 702, in order to provide redundancy, increased throughput, and decreased latency, among other advantages.

There are many factors to consider in determining paths through the network fabric 702. Some factors include the number of layers in the fabric, L, the number of nodes per layer, $N_L$, the switch controller's topology and connectivity graph (and whether the switch controller 708 is capable of globalizing the routing decisions), etc.

Furthermore, in order for multipathing to take place in the network fabric 702, the multipathing may take place in-order via Equal Cost Multi-Pathing (ECMP) and/or LAG hashing (and what type of hash used may be a consideration, such as an industry standard, a legacy system, etc.). In addition, the multipathing may support high performance operation via adaptive routing.

Converged Enhanced Ethernet (CEE) may also be supported by the network fabric 702, such as by using Priority Flow Control (PFC) and/or Enhanced Transmission Selection (ETS) along the complete path through the network fabric 702 in addition to Quantized Congestion Notification (QCN). Additionally, link congestion may trigger saturation tree with QCN.

In one embodiment, interface-based path representation, where a single interface to a network may be used to gain perspective on the network from a point of view of that interface. This interface-based path representation may then be used to span the network fabric 702, as shown in FIG. 7. For example, Host 1 is shown connected directly to fabric switch S1. In this example, the interface for Host 1 to the network fabric 702 may be a single physical port, a virtual port, a static LAG, a dynamic LAG, or any other suitable interface between Host 1 and fabric switch S1. Also, in this example, a global forwarding table may be created, managed, updated, and utilized by the switch controller 708 to make routing decisions, for example, once a packet is received by fabric switch S1 from Host 1 all the way until the packet is received by Host 2 via switch S3.

In one embodiment, the switch controller 708 may be consulted anytime a routing decision is to be made for a packet received by any of the fabric switches 704 in the network fabric 702.

In another embodiment, each fabric switch 704 may have resident therein a source-routing table. In this case, the fabric switch 704 inserts the route information into each incoming packet that does not yet have source-routing information stored therein. One disadvantage of this approach is that a lot of redundancy in terms of routing information in the network is introduced, which makes routing updates cumbersome, since they must be done for each fabric switch 704 in the network fabric 702. One advantage of this approach is that legacy (i.e., non-source routing capable) devices and components (e.g., network interface cards (NICs), legacy switches, etc.) may be attached to the network fabric 702.

A SDN, such as system 700, may have a common management framework for assignment of bandwidth to frame priorities, according to one embodiment. This SDN may be implemented as an extension to any overlay network protocol, such as Distributed Overlay Virtual Ethernet (DOVE), VXLAN, NVGRE, etc., and may be used with existing virtualization platforms from any number of vendors, such as VMWare's ESX, IBM's PowerVM, KVM, Microsoft's Hyper-V, Xen, etc. The resulting virtualization platform virtual switch (vSwitch) allows data to be organized into priority groups (also referred to as "traffic classes"), each of which is assigned a priority group identification (ID), such as a number, an alphanumeric string, etc. The priority grouping is created by and stored within a traffic manager in the server or vSwitch. Furthermore, in some approaches, the priority grouping does not require a special frame format in order to be recognized by devices which are capable of implementing traffic priority handling.

According to one embodiment, within a SDN environment, such as system 700, the use of broadcast/multicast routing tables may be avoided by using self-routed packets that receive their routing information directly from a switch controller 708 within the system 700, and by implementing a switch-specific path identifier to create a broadcast group. Within this SDN environment, a method for credit assignment may be implemented from a switch controller 708 repository, which may implement a credit manager.

Each switch 704 in the network fabric 702 may have an allotment of flow credits. The flow credits may be provided by the switch controller 708, in one embodiment, as a central credit manager. A switch 704 exchanges flow credits with another switch 704 when a packet is to be sent to a next hop on a multicast path in order to determine if the packets should be sent to the other switch 704, once the appropriate output ports have been determined. These flow credits that are used in multicast packet switching are able to coexist with credit-based unicast flow between any servers and edges of the network fabric 702 (e.g., a multicast packet forwarding chain is made to look like a series of unicast packet forwards for purposes of performing credit-based flow control).

In one embodiment, flow credits may be specified in terms of quantas, where one flow credit is equivalent to one or more quanta, with one quanta being equivalent to 512 bits. Flow credits may be assigned based on a per virtual link, per virtual channel, per priority, or any other form of bandwidth slicing, according to various approaches.

According to one embodiment, a mechanism for determining flow credit aging may be based on providing a common, distributed clock signal to all switches 704 in the network fabric 702 (for example, a PTP 1588 clock, or some other clock signal known in the art). Each switch 704 is not required to receive a synchronous time of day clock, only that some form of clocking is provided to the switch 704 to determine credit age on longer or higher data rate links 706. At each end of the link 706, both the number and age of flow credits on a link 706 may be verified to insure data is only transmitted against currently live flow credits. Each flow credit has a lifetime determined by the switch controller 708, based on the distance-bandwidth product of the link 706 and/or any other relevant factor(s). In further embodiments, other factors may be used to determine longevity of the flow credits, as would be understood by one of skill in the art, such as amount of network traffic, need for transmission, specific application considerations, flow credits which are flagged as never expiring, etc.

For example, on extended distance links, a data source may count flow credits based on a transfer time for a round trip packet, allowing for flow credits that are "stored" in flight on the link. Expired flow credits are thereby detected and removed from the system 700, thereby avoiding so-called "zombie credits" from unexpectedly eating up network bandwidth at inopportune times.

Shared distributed clocking is useful for both long distance and high data rate links (e.g., at terabit/second or above, tolerances on the order of nanoseconds become significant in credit management). In order to allow legacy networks to coexist with this approach, a default proxy gateway 716 may be positioned between all flow credit-based network fabrics, such as network fabric 702 and any noncredit-based networks, such as network 718.

In addition, in some embodiments, a new Ethertype may be used for packets in networks using credit-based flow control which are distinguishable from other Ethertypes that may be used for packets in networks which rely on other flow control methodologies and/or standard Ethernet protocols.

In addition, in some approaches, the switch controller 708 may be aware of maximum transmission units (MTUs) for all inter-switch links (ISLs) positioned between switches 704 in the network (the ISLs are not shown for clarity). In another approach, the switch controller 708 may create a multicast path which uses only one step of segmentation and reassembly of packets occurring at either end of the link representing the multicast path. Thus, packet fragmentation is allowed under the credit-based flow control scheme described herein according to multiple embodiments.

In addition, in some approaches, different transmission protocols may be combined in the system 700 through the use of the gateway 716 or some other suitable device(s). Exemplary protocols include, but are not limited to, Fiber Channel over Ethernet (FCoE) storage, Remote Direct Memory Access (RDMA) over Converged Ethernet (RoCE) clustering, etc.

According to one embodiment, a system comprises a hardware processor and logic integrated with and/or executable by the processor. The logic is adapted to generate a plurality of flow credits and distribute one or more flow credits to every interface and/or port. The flow credits are exchanged with other devices in order to provide for processing of packets sent thereto, and an amount of flow credits distributed to an interface or port is proportionate to a bandwidth of the interface or port or according to a predetermined policy. In a further embodiment, every interface and/or port may be local to the system, and the other devices to which packets are sent may be external to the system. Also, the policy dictates bandwidth control for each interface and/or port in the system. In another embodiment, every interface and/or port in an entire network may have flow credits distributed thereto from a central repository, such as a credit manager, switch controller, etc.

In another embodiment, the logic may be further adapted to facilitate implementation of various bandwidth management policies on the system, on interfaces of a switch or router within the network, and/or on ports of a switch or router within the network. In a further embodiment, the flow credit generation and distribution may be adapted to be controlled by a switch controller in communication with the system. The switch controller may also be adapted to govern the various bandwidth management policies.

Figure 8:
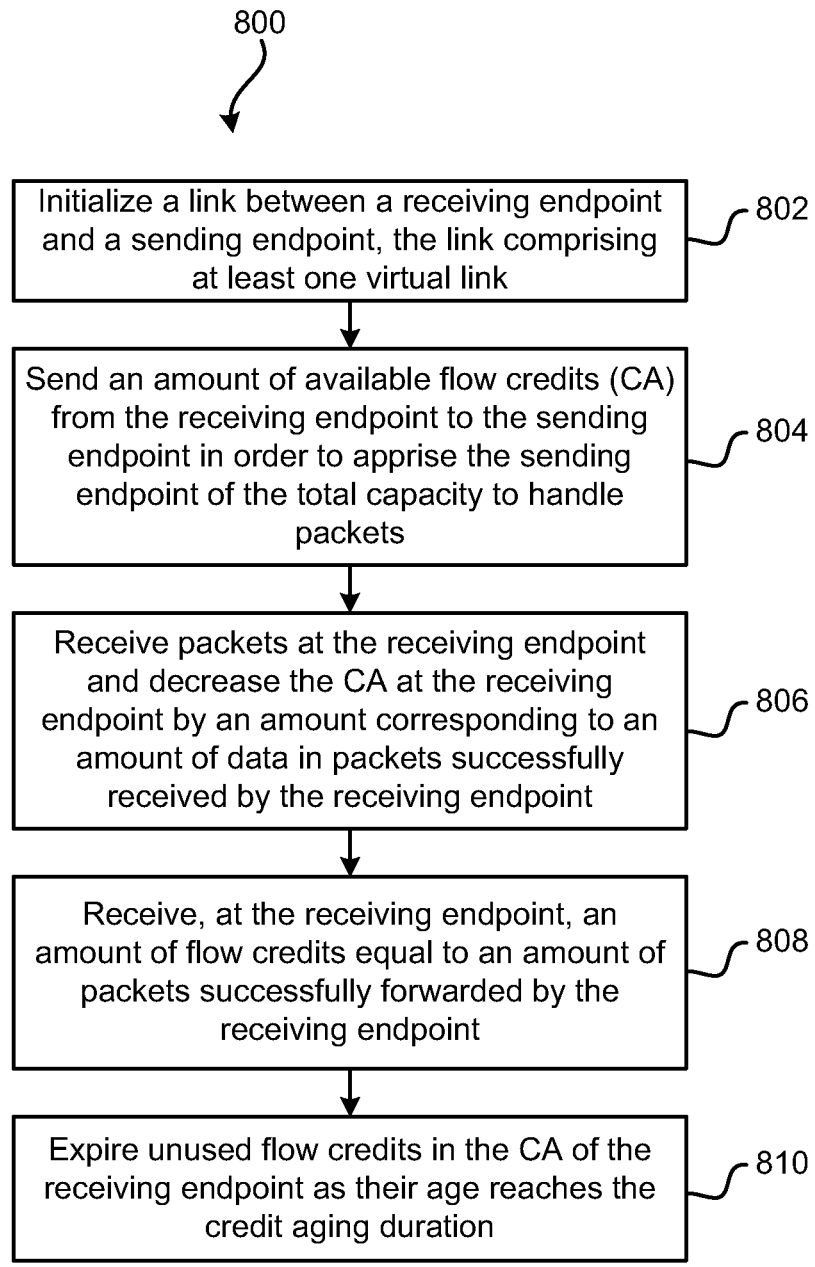
FIG. 8 shows a flowchart of a method according to one embodiment.
Figure 9:
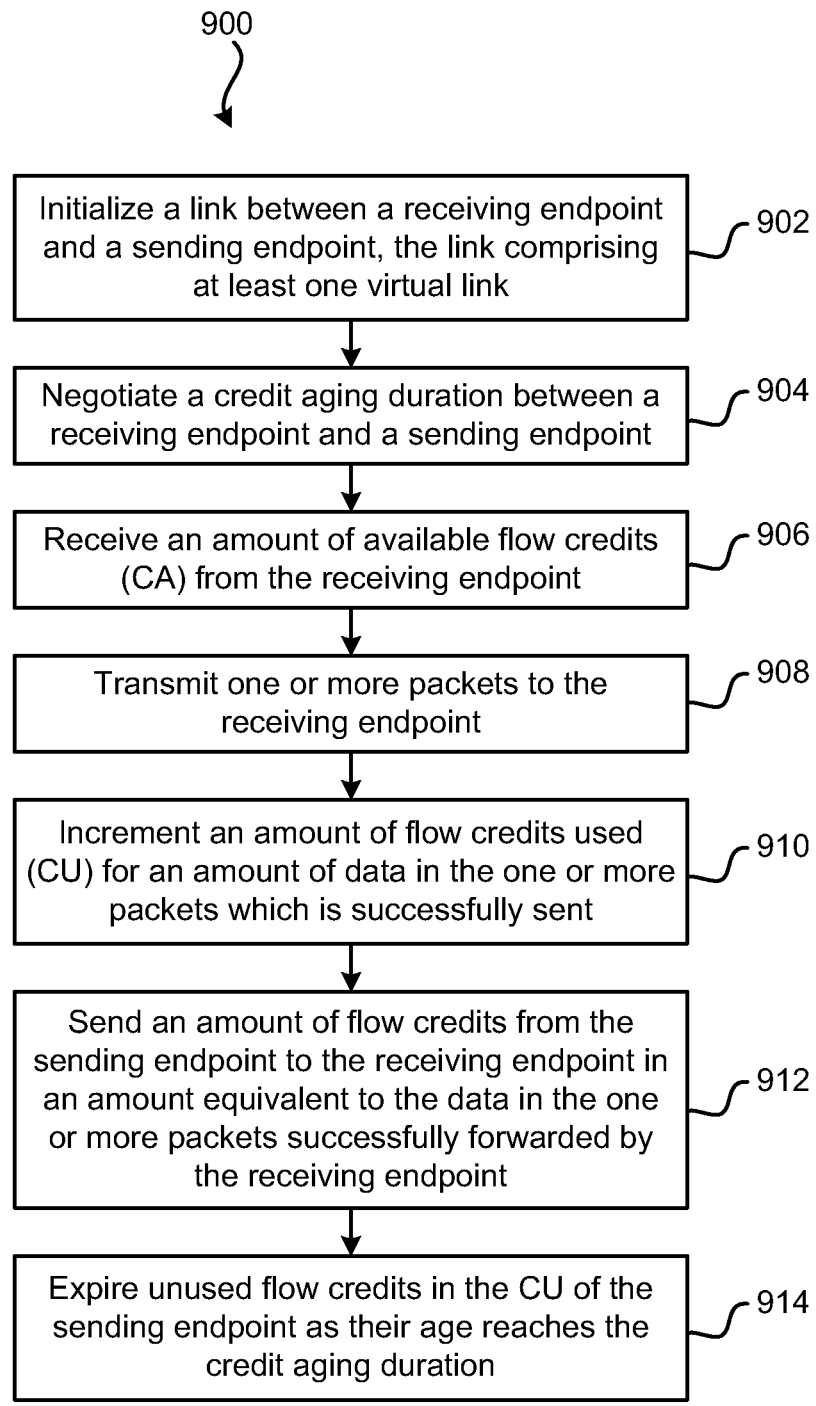
FIG. 9 shows a flowchart of a method according to one embodiment.

Now referring to FIGS. 8-9, methods for calculating exchange of flow credits are described, according to various embodiments. Of course, any suitable method or algorithm may be used, and the methods described below are not limiting on the types of algorithms or methods that may be used in conjunction with the credit-based flow control schemes described herein.

In methods 800 and 900, the total flow credit capacity of the receiving endpoint is denoted by CTA, the flow credits available at the receiving endpoint is denoted by CA, and the flow credits used by the sending endpoint are denoted by CU. Furthermore, the methods 800 and 900 take into account the age of the flow credits through the use of a timer, which may be a native periodic timer used at both a sending and a receiving endpoint to age out unused and/or stale flow credits.

According to one embodiment, the method 800 may be performed by a receiving endpoint, while method 900 may be performed by a sending endpoint.

Referring now to FIG. 8, method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in one embodiment, the method 800 may be partially or entirely performed by a receiving endpoint, a vSwitch hosted by a server, a server, a switch controller (such as a SDN controller, OpenFlow controller, etc.), a credit manager, a traffic controller, a processor (such as a CPU, an ASIC, an FPGA, etc.), a NIC, a vNIC, a virtualization platform, or any other suitable device or component of a network system or fabric.

As shown in FIG. 8, method 800 may initiate with operation 802, where a link is initialized between a receiving endpoint and a sending endpoint. The link comprises at least one virtual link, as described above in more detail. In one embodiment, the sending endpoint establishes the link with the receiving endpoint. In another embodiment, a switch controller may establish the link. Of course, any other method of initializing the link may be used, as known in the art.

In one embodiment, a credit aging duration may be negotiated between the receiving endpoint and the sending endpoint during initialization. The credit aging duration may be determined based on one or more factors, such as a speed of the link, a distance between the endpoints, a bit size of the flow credits, etc. In another embodiment, a timer is started to time an age of the flow credits in the CA possessed by the receiving endpoint.

In operation 804, the CA is sent from the receiving endpoint to the sending endpoint in order to apprise the sending endpoint of the total capacity to handle packets. In various embodiments, this operation may be performed during or subsequent to link initialization. In addition, the CA presented at initialization is equal to the CTA for the receiving endpoint, because there have been no requests for transmission at initialization of the link. Of course, if other sending endpoints have already established a link with the receiving endpoint, there may be multiple demands for flow credits, even at initialization. This may be taken into account at link initialization, such by reducing the CTA by the amount, if any, of flow credits demanded by the other sending endpoint.

In addition, after initialization and during runtime, operation 804 may be repeated, along with operations 806-810, however many times are needed to receive all packets from the sending endpoint. In subsequent iterations, the CA may no longer be equal to the CTA, because the sending endpoint may have consumed some of the flow credits available, or there may be in-flight flow credits which have not yet been processed at either end of the link.

In operation 806, after link initialization, packets are received by the receiving endpoint and the CA at the receiving endpoint is decreased by an amount corresponding to an amount of data in packets successfully received (i.e., packets which are received without error or with an amount of error below a predetermined threshold). In one embodiment, the number of quantas in every data packet successfully received may be used to decrement the CA by an equal number of flow credits (when a flow credit is equal to one or more quanta, each quanta=512 bits).

According to a further embodiment, if the data received by the receiving endpoint is corrupted, runt, or otherwise unusable, and the amount of data received accounts for less than one quanta of data, i.e., less than 512 bits, the receiving endpoint may return an amount of flow credits back to the sending endpoint equivalent to the amount of data that is unusable. In this way, the wasted flow credits may be returned back to the sending endpoint. Then, the sending endpoint may use the returned flow credit(s) to retransmit the corrupted data frame(s), assuming that the sending endpoint is capable of identifying the corrupted frame(s).

In operation 808, an amount of flow credits in an amount equivalent to the data in the one or more packets successfully forwarded by the receiving endpoint is sent from the sending endpoint to the receiving endpoint, thereby replenishing the CA. In one embodiment, the sending endpoint replenishes the CA with flow credits for receiving every quanta successfully consumed by a NIC driver of the receiving endpoint which is used to forward packets away from the receiving endpoint (to their next hop).

In operation 810, and throughout the method 800, unused flow credits in the CA of the receiving endpoint are expired as their age reaches the credit aging duration, as negotiated during initialization. Thereafter, the timer for expiring stale flow credits is restarted, and the method 800 returns to operation 804.

Furthermore, exchange of flow credits is performed on a per virtual link basis in method 800, according to one embodiment.

Referring now to FIG. 9, method 900 may be performed in accordance with the present invention in any of the environments depicted in FIGS. 1-7, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in one embodiment, the method 900 may be partially or entirely performed by a receiving endpoint, a vSwitch hosted by a server, a server, a switch controller (such as a SDN controller, OpenFlow controller, etc.), a credit manager, a traffic controller, a processor (such as a CPU, an ASIC, an FPGA, etc.), a NIC, a vNIC, a virtualization platform, or any other suitable device or component of a network system or fabric.

As shown in FIG. 9, method 900 may initiate with operation 902, where a link is initialized between a receiving endpoint and a sending endpoint. The link comprises at least one virtual link, as described above in more detail. In various embodiments, the receiving endpoint establishes the link with the sending endpoint or vice versa. In another embodiment, a switch controller may establish the link. Of course, any other method of initializing the link may be used, as known in the art.

In operation 904, a credit aging duration is negotiated, such as between a receiving endpoint and a sending endpoint, the receiving endpoint being a destination for one or more packets that are sent from the sending endpoint. Initially, the CU is equal to zero, because no packets have been transmitted to the receiving endpoint.

In operation 906, a CA is received from the receiving endpoint. This CA is used to determine whether there is capacity to send additional packets to the receiving endpoint after an initial transmission.

In operation 908, one or more packets are transmitted from the sending endpoint to the receiving endpoint.

In operation 910, CU is incremented for an amount of data in the one or more packets which is successfully sent. In one embodiment, this may be indicated by each quanta of data that is successfully transmitted by a NIC driver of the sending endpoint. Of course, since the flow credits may represent any amount of data, the CU is incremented by an amount corresponding to an amount of data actually sent.

In operation 912, an amount of flow credits is sent from the sending endpoint to the receiving endpoint in an amount equivalent to the data in the one or more packets successfully forwarded by the receiving endpoint.

In one embodiment, it may be determined whether additional packets from the one or more packets may be sent to the receiving endpoint. This determination may be based on the CA, the CU, and an amount of remaining data in the one or more data packets left to be transmitted, such that when (CU+Quantas in Data Packet to be sent)≤CA, the data packet is sent. Otherwise, the sending endpoint waits until this condition is satisfied. Particularly, in one embodiment, the sending endpoint may wait for the receiving endpoint to acquire additional flow credits, which will be reflected in a new CA sent therefrom.

In operation 914, and throughout the method 900, unused flow credits, such as in the CU of the sending endpoint, are expired as their age reaches the credit aging duration, as negotiated during initialization. Thereafter, the timer for expiring stale flow credits is restarted, and the method 900 returns to operation 906.

Furthermore, exchange of flow credits is performed on a per virtual link basis in method 900, according to one embodiment.

Figure 10:
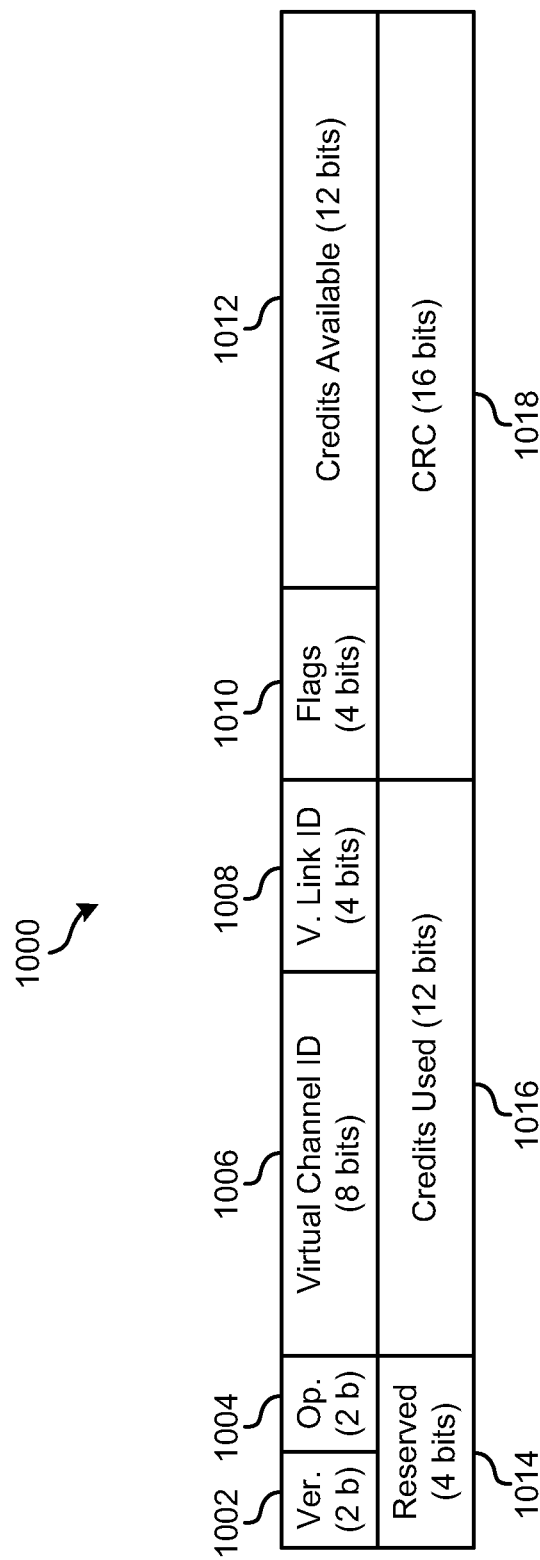
FIG. 10 shows an exemplary frame format for credit-based flow control, according to one embodiment.

Now referring to FIG. 10, an exemplary frame format 1000 for credit-based flow control is shown according to one embodiment. This frame format 1000 may be positioned with a payload of an Ethernet packet, or some other payload, as would be understood by one of skill in the art. The frame format 1000 may include any or all of the following fields, and may be arranged as shown in FIG. 10, or may be arranged in some other orientation as desired. The exemplary orientation shown in FIG. 10 is a compact orientation which allows for the same bit length in both rows of the frame format 1000. The aligned fields improve cache line efficiency, according to one approach.

The version (Ver.) field 1002 may be used to enhance the frame format in the future or as desired by a user, such as to support more granularity by including the ability to add additional priorities and/or virtual link IDs. In one embodiment, the version field 1002 may be 2 bits in length. In other embodiments, any length as desired and/or as needed may be used.

The operation (Op.) field 1004 may be used to indicate whether the packet is being used for initialization or synchronization purposes, such as by setting a bit to 0 or 1, e.g., 0 for init, 1 for sync. In one embodiment, the operation field 1004 may be 2 bits in length. In other embodiments, any length as desired and/or as needed may be used.

The virtual channel ID field 1006 may be used to store an identifier for the particular virtual channel on which the packet is to be sent. The virtual channel ID field 1006 may be any length necessary to be used to store a plurality of IDs. In one embodiment, the virtual channel ID field 1006 may be 8 bits in length in order to accommodate $2^8$ different tenants. In other embodiments, any length as desired and/or as needed may be used.

The virtual link ID (V. Link ID) field 1008 may be used to denote which of a plurality of virtual links the packet is to be sent via. The virtual link ID field 1008 may be any length necessary to be used to store a plurality of IDs. In one embodiment, the virtual link ID 1008 may be 4 bits in length in order to accommodate $2^4$ different possible virtual links. In other embodiments, any length as desired and/or as needed may be used. Should a tenant desire more possible virtual links, then an additional virtual channel may be assigned to the tenant.

According to the exemplary frame format 1000 shown in FIG. 10, the virtual link ID 1008 and the virtual channel ID field 1006 are provided at the beginning of the frame for quick access to identification logic for more efficient processing of the packet.

The flags field 1010 may be used to indicate direction and/or any additional details as desired by a tenant and/or user. In one embodiment, the flags field 1010 may be 4 bits in length. In other embodiments, any length as desired and/or as needed may be used.

The credits available field 1012 may be used to indicate how many flow credits are available to transmit this and any subsequent packets. When the packet is sent from a sending endpoint, the amount of available flow credits is determined and stored to this field. In one embodiment, the credits available field 1012 may be 12 bits in length. In other embodiments, any length as desired and/or as needed may be used.

The reserved field 1014 may be used for any purpose as desired by a tenant and/or user, or may be configured to store particular information. In one embodiment, the reserved field 1014 may be 4 bits in length. In other embodiments, any length as desired and/or as needed may be used.

The credits used field 1016 may be used to indicate how many flow credits have been used to transmit this and any prior packets. When the packet is sent from a sending endpoint, the amount of used flow credits may be subtracted from an amount of available flow credits to determine if there are enough flow credits remaining to transmit subsequent packets. In one embodiment, the credits used field 1016 may be 12 bits in length, the same as the credits available field 1012. In other embodiments, any length as desired and/or as needed may be used.

The cyclic redundancy check (CRC) field 1018 may be used to ensure integrity of the frame, as would be understood by one of skill in the art. In one embodiment, the CRC field 1018 may be 16 bits in length. In other embodiments, any length as desired and/or as needed may be used.

According to one embodiment, a system may comprise a hardware processor and logic integrated with and/or executable by the processor or MAC functionality of a network port. The MAC functionality may be adapted to handle any lookup, servicing, processing, routing, forwarding, etc., for packets based on one or more MAC addresses. This system may be a receiving endpoint, a sending endpoint, a switch controller, or any other suitable network device, in various approaches. The logic may be adapted to initialize a link between a receiving endpoint and a sending endpoint, the receiving and sending endpoints being connected in a network fabric, receive an amount of available flow credits from the receiving endpoint, wherein the amount of available flow credits is used to determine a capacity to process packets at the receiving endpoint, and transmit one or more packets to the receiving endpoint until all packets are sent or the amount of available flow credits is insufficient to process additional packets. At least one virtual link is created within the link, in order to provide for exchange of flow credits on a per virtual link basis.

In another embodiment, the logic may be further adapted to negotiate a credit aging duration during the initialization of the link, the credit aging duration being used to expire flow credits after the credit aging duration is reached.

According to another embodiment, the credit aging duration may be determined based on a speed of the link between the receiving endpoint and the sending endpoint. Furthermore, in some approaches, the logic may be further adapted to expire unused flow credits from the amount of available flow credits as their age reaches the credit aging duration.

In another approach, each flow credit may allow for one or more quanta of data to be transmitted, and data successfully received may be measured in quanta.

In accordance with another approach, the logic may be further adapted to decrease the amount of available flow credits by an amount corresponding to data in the one or more packets that is successfully received by the receiving endpoint, and provide replacement flow credits to the receiving endpoint equal to the data in the one or more packets successfully forwarded by the receiving endpoint.

In another embodiment, a computer program product for providing credit-based flow control may comprise a computer readable storage medium having program code embodied therewith. The program code may be readable/executable by a processor to initialize, using the processor, a link between a receiving endpoint and a sending endpoint, the receiving and sending endpoints being connected in a network fabric; send, using the processor, an amount of available flow credits to the sending endpoint, wherein the amount of available flow credits is used to determine a capacity to process packets; receive, using the processor, one or more packets from the sending endpoint; decrease, using the processor, the amount of available flow credits by an amount corresponding to data in the one or more packets that is successfully received; and receive, using the processor, replacement flow credits equal to the data in the one or more packets successfully forwarded by the receiving endpoint. At least one virtual link is created within the link, in order to provide for exchange of flow credits on a per virtual link basis.

In some further embodiments, the program code readable/executable by the processor may be further configured to negotiate a credit aging duration between the receiving endpoint and the sending endpoint during initialization of the link, the credit aging duration being used to expire flow credits after the credit aging duration is reached. In a further embodiment, the credit aging duration may be determined based on a speed of the link between the receiving endpoint and the sending endpoint. In another further approach, the program code readable/executable by the processor may be further configured to expire unused flow credits from the amount of available flow credits as their age reaches the credit aging duration.

In another approach, each flow credit may allow for one or more quanta of data to be transmitted, and wherein data successfully received is measured in quanta.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
 a hardware processor and logic integrated with and/or executable by the processor or media access control (MAC) functionality of a network port, the logic being configured to:
   initialize a link between a receiving endpoint and a sending endpoint, the receiving and sending endpoints being connected in a network fabric, wherein at least one virtual link is created within the link;
   negotiate a credit aging duration during initialization of the link, wherein the credit aging duration is determined at least partially based on a speed of the link between the receiving endpoint and the sending endpoint;
   receive an amount of available flow credits from the receiving endpoint, wherein the amount of available flow credits are used to determine a capacity to process packets at the receiving endpoint;
   transmit one or more packets to the receiving endpoint until all packets are sent or the amount of available flow credits is insufficient to process additional packets; and
   expire unused flow credits from the amount of available flow credits as an age of the unused flow credits reaches the credit aging duration,
   wherein the receiving endpoint and the sending endpoint each track an age of flow credits using a local clock or a synchronized clock, and
   wherein exchange of flow credits is performed on a per virtual link basis.

2. The system as recited in claim 1, wherein the logic is further configured to expire unused flow credits from the amount of available flow credits as their age reaches the credit aging duration.

3. The system as recited in claim 1, wherein each flow credit allows for one or more quanta of data to be transmitted, wherein data successfully received is measured in quanta, and wherein successfully received data includes data which is received with an amount of error below a predetermined threshold including data which is received without error.

4. The system as recited in claim 1, wherein the logic is further configured to:
 decrease the amount of available flow credits by an amount corresponding to data in the one or more packets that is successfully received by the receiving endpoint, wherein successfully received data includes data which is received with an amount of error below a predetermined threshold including data which is received without error; and
 provide replacement flow credits to the receiving endpoint equal to the data in the one or more packets successfully forwarded by the receiving endpoint, wherein successfully forwarded data includes data which is consumed by a network interface card (NIC) driver of the receiving endpoint, the NIC driver being used to forward packets away from the receiving endpoint.

5. A computer program product for providing credit-based flow control, the computer program product comprising a computer readable storage medium having program code embodied therewith, the program code readable/executable by a processor to:
 initialize, using the processor, a link between a receiving endpoint and a sending endpoint, the receiving and sending endpoints being connected in a network fabric, the link comprises at least one virtual link;

negotiate, using the processor, a credit aging duration during initialization of the link, wherein the credit aging duration is used to expire flow credits after the credit aging duration is reached rendering the flow credits unusable;

send, using the processor, an amount of available flow credits to the sending endpoint, wherein the amount of available flow credits are used to determine a capacity to process packets;

receive, using the processor, one or more packets from the sending endpoint;

decrease, using the processor, the amount of available flow credits by an amount corresponding to data in the one or more packets that is successfully received; and receive, using the processor, replacement flow credits equal to the data in the one or more packets successfully forwarded by the receiving endpoint, wherein exchange of flow credits is performed on a per virtual link basis.

6. The computer program product as recited in claim 5, wherein the credit aging duration is determined based on at least one characteristic of the link.

7. The computer program product as recited in claim 6, wherein the credit aging duration is at least partially determined based on a speed of the link between the receiving endpoint and the sending endpoint and a bit size of the flow credits, and wherein the receiving endpoint and the sending endpoint each track an age of flow credits using a local clock or a synchronized clock.

8. The computer program product as recited in claim 6, wherein the program code readable/executable by the processor is further configured to expire unused flow credits from the amount of available flow credits as their age reaches the credit aging duration.

9. The computer program product as recited in claim 5, wherein each flow credit allows for one or more quanta of data to be transmitted, wherein data successfully received is measured in quanta, wherein successfully received data includes data which is received with an amount of error below a predetermined threshold including data which is received without error, and wherein successfully forwarded data includes data which is consumed by a network interface card (NIC) driver of the receiving endpoint, the NIC driver being used to forward packets away from the receiving endpoint.

10. A method for providing credit-based flow control, the method comprising:

initializing a link between a receiving endpoint and a sending endpoint, the receiving and sending endpoints being connected in a network fabric, wherein the link comprises at least one virtual link;

negotiating a credit aging duration during initialization of the link, wherein the credit aging duration is used to expire flow credits after the credit aging duration is reached, wherein the credit aging duration is determined at least partially based on a speed of the link between the receiving endpoint and the sending endpoint; and in an iterative process until the sending endpoint has no further packets to transmit:

sending an amount of available flow credits from the receiving endpoint to the sending endpoint, wherein the amount of available flow credits are used to determine a capacity to process packets at the receiving endpoint;

receiving, at the receiving endpoint, one or more packets transmitted from the sending endpoint;

decreasing the amount of available flow credits by an amount corresponding to data in the one or more packets that is successfully received by the receiving endpoint;

expiring unused flow credits from the amount of available flow credits as an a of the unused flow credits reaches the credit aging durations and receiving, at the receiving endpoint, an amount of flow credits transmitted from the sending endpoint in an amount equivalent to the data in the one or more packets successfully forwarded by the receiving endpoint, wherein exchange of flow credits is performed on a per virtual link basis.

11. The method as recited in claim 10, wherein the credit aging duration is determined based on a round trip time (RTT) of the link.

12. The method as recited in claim 10, wherein each flow credit allows for one or more quanta of data to be transmitted, wherein data successfully received is measured in quanta, and wherein successfully received data includes data which is received with an amount of error below a predetermined threshold including data which is received without error.

13. The method as recited in claim 10, wherein initially, the amount of available flow credits is equal to a total capacity of flow credits at the receiving endpoint.

14. The method as recited in claim 10, wherein the amount of available flow credits are replenished for every quanta successfully consumed by a network interface card (NIC) driver of the receiving endpoint which is used to forward the one or more received packets away from the receiving endpoint.

15. The method as recited in claim 10, further comprising tracking an age of flow credits using a local clock or a synchronized clock using the receiving endpoint.

16. The method as recited in claim 15, further comprising determining the credit aging duration based on a round trip time (RTT) of the link.

17. A system, comprising a hardware processor and logic integrated with and/or executable by the processor, the logic being configured to:

generate a plurality of flow credits;

determine a credit aging duration based at least partially on speeds of links between interface and/or ports, wherein the credit aging duration is used to expire flow credits after the credit aging duration is reached;

distribute one or more flow credits to every interface and/or port to be exchanged on a per virtual link basis; and expire unused flow credits from an amount of available flow credits at one or more interface and/or port as an age of the unused flow credits reaches the credit aging duration, wherein the flow credits are exchanged with other devices in order to provide for processing of packets sent thereto, and wherein an amount of flow credits distributed to an interface and/or port is proportionate to at least one of: a bandwidth of the interface and/or port and according to a predetermined policy.

18. The system as recited in claim 17, wherein every interface and/or port are local to the system, wherein the other devices are external to the system, and wherein the policy dictates bandwidth control for each interface and/or port in the system.

19. The system as recited in claim 17, wherein the logic is further configured to facilitate implementation of various bandwidth management policies on the system, on interfaces, and/or on ports.

20. The system as recited in claim 19, wherein the flow credit generation and distribution is configured to be controlled by a switch controller in communication with the system, wherein the switch controller is configured to govern the various bandwidth management policies.

* * * * *